US006419867B1

(12) United States Patent
Lang et al.

(10) Patent No.: US 6,419,867 B1
(45) Date of Patent: Jul. 16, 2002

(54) PROCESS OF MAKING PADDING MATERIAL

(75) Inventors: Bruno Lang, Bermatiggen; Jens Erlecke, Wolfegg, both of (DE)

(73) Assignee: Schleicher & Co. International (DE)

( * ) Notice: Subject to any disclaimer, the term of this patent is extended or adjusted under 35 U.S.C. 154(b) by 0 days.

(21) Appl. No.: 09/489,406

(22) Filed: Jan. 21, 2000

(30) Foreign Application Priority Data

Jan. 21, 1999 (DE) ........................................ 199 02 227
Mar. 16, 1999 (DE) ........................................ 199 11 628

(51) Int. Cl.[7] ............................ B26F 1/10; B28B 11/12; B29C 69/00; B29D 31/00

(52) U.S. Cl. ....................... 264/156; 264/103; 264/147; 264/163

(58) Field of Search ................................ 264/103, 147, 264/156, 163

(56) References Cited

U.S. PATENT DOCUMENTS

| | | | | |
|---|---|---|---|---|
| 3,642,967 A | * | 2/1972 | Doll | 264/147 X |
| 5,297,416 A | | 3/1994 | Alhamad et al. | |
| 5,297,919 A | | 3/1994 | Reichental et al. | |
| 5,439,730 A | | 8/1995 | Kelly et al. | |
| 5,667,871 A | | 9/1997 | Goodrich et al. | |

FOREIGN PATENT DOCUMENTS

| | | | | |
|---|---|---|---|---|
| DE | 32 47 046 C2 | | 9/1989 | |
| DE | 37 50 183 T2 | | 10/1994 | |
| DE | 196 27 599 A1 | | 1/1998 | |
| DE | 196 29 564 A1 | | 1/1998 | |
| DE | 198 35 093 A1 | | 2/1999 | |
| JP | 58181620 A | * | 10/1983 | 264/103 |

OTHER PUBLICATIONS

Sass, F., u.a.: Dubbels Taschenbuch für den Maschinenbau, Springer Verlag, Berlin, u.a., 1961, 2. Bd., 12. Auft., S.908.

* cited by examiner

*Primary Examiner*—Leo B. Tentoni
(74) *Attorney, Agent, or Firm*—Akerman Senterfitt

(57) ABSTRACT

In a method for the manufacture of padding material from inherently rigid flat material, such as cardboard packaging or the like, the flat material is cut into parallel strip sections, which in the vicinity of connecting areas spaced in the longitudinal direction of the strips remain partly interconnected. Between the connecting areas the strip sections are so deformed perpendicular to the flat material extension that transversely adjacent strip sections are bent in opposite directions. A manufacturing apparatus is constructed in the manner of a document shredder with a cutting mechanism having cooperating cutting rollers, which have circumferential grooves, which during the passage of the flat material at regular intervals lead to an interruption of the cut.

4 Claims, 4 Drawing Sheets

PROCESS OF MAKING PADDING MATERIAL

BACKGROUND OF THE INVENTION

The invention relates to a method and an apparatus for the manufacture of padding material, particularly for packaging purposes, as well as a corresponding padding material.

In many fields of the trade in goods, e.g. in production enterprises, in commerce or for final consumers frequently packagings arise in large quantities and are usually disposed of unused following the removal of the goods, Packagings made from inherently rigid flat material such as cardboard, corrugated board, board or the like are generally torn for this purpose or broken into small pieces in some other way and after collection serve as waste paper.

Not inconsiderable labour and other cost arise in the case of disposal in accordance with regulations.

A further problem in the packaging sector occurs with padding materials, which are used in the packing of products sensitive to mechanical actions, so as to protect said products, e.g. during transportation against impacts and similar effects. Frequently use is made of plastic chips as padding material and they give rise to considerable costs both during manufacture and disposal and are prejudicial to the environment if not correctly disposed of.

The object of the invention is to propose improvements in the packaging sector.

SUMMARY OF THE INVENTION

According to the method of the invention a padding material more particularly suitable for packaging purposes is manufactured from inherently rigid flat material, such as cardboard, board, etc., in that the flat material is so partially separated into strip sections, that in the transverse direction of the strips neighbouring strip sections remain interconnected by spaced connecting areas and in that the strip sections are so deformed in a direction at right angles to a neutral face of the flat material between the connecting areas that in the transverse direction adjacent strip sections are deflected in opposite directions.

As a result of the inventive shaping of the flat material with respect to the starting flat material a disposal problem may be solved and as a result of the resulting padding material a manufacturing problem is solved. An inherently prejudicial, namely superfluous starting material, such as cardboard packaging is not disposed of in an expensive manner and is instead appropriately transformed directly for reuse. From the substantially two-dimensional flat material, which can e.g. have a thickness between approximately 0.5 and approximately 5 mm and which is only generally slightly compressible perpendicular to the surface extension, as a result of the shaping according to the invention a padding material with a substantially three-dimensional structure is created and now the material “thickness” determined by the enveloping surface of the deformed material can be a multiple of the starting thickness and a shock-absorbing resilience is created in the vicinity of the deflected strip sections. Through the separation into longitudinal strips the padding material is readily flexible in the transverse direction, so that it can e.g. be eminently placed around the bottle contour for packing bottles. A bending and/or compression of the structure comprising connected strips is also possible in the longitudinal direction. The padding effect is essentially produced in the vicinity of the oppositely deflected strip sections which, following separation and deformation, are substantially permanently deflected and are frictionally held in shape by edge friction. Improvements in retaining the deflection can be obtained in that the cut is made slightly frayed or toothed. This can be achieved by correspondingly manufactured cutting disks of the apparatus.

Although it is possible to deflect several adjacent strips as a group in one direction and a following group or an individual strip in the opposite direction, preferably individual strip sections are alternately deflected in opposite directions, so that a particularly good padding action is obtained.

The open, three-dimensional padding material structure can e.g. be produced by a punching process, in which the shaping substantially takes place simultaneously over a larger and in particular the entire surface of the starting material. Preference is given a separation by strip cutting with a cutting direction parallel to the neutral face of the flat material and for producing the connecting sections strip cutting is zonally interrupted. This permits the shaping of the starting material in energy-saving manner in a continuously progressing process and for producing larger area padding material parts use can be made of relatively small cutting devices which can be set up in space-saving manner. For padding material production it is possible to use appropriately modified document shredders or the like designed for strip cutting.

A particularly advantageous material structure can be obtained in a further development in that groups of e.g. three transversely adjacent connecting areas are in each case separated from one another in the transverse direction. This makes it possible to improve the flexibility of the padding material in the longitudinal direction, i.e. with a curvature about a transverse direction-parallel axis, because in the separating area it is possible to obtain an opposing movement of the groups of strips in each case connected at the connecting areas. This also creates a reversible extensibility of the material in the transverse direction.

The padding material made possible by the invention can exclusively comprise the inherently rigid starting flat material, because in padding material production it is not necessary to add new substances such as adhesives or the like or to work at temperatures or environmental conditions where possibly unfavourable changes could occur. Suitable starting materials are in particular packaging materials such as stiff paper, fine board, cardboard or corrugated board, the materials being in single or multiple layer form. Typical starting thicknesses are between approximately 0.5 and approximately 5 mm, but in exceptional cases can be larger or smaller. Typical padding material thicknesses can be approximately twice to five times the starting material thickness and/or between approximately 1 mm and approximately 25 to 30 mm. Particularly suitable strip widths of the normally substantially parallel side-bounded strip sections can be between approximately 0.5 and 4 times the flat material thickness, particularly between once and twice said starting thickness. Such relatively compact cross-sections are particularly shape-retaining and damping-aiding.

The average strip length between successive connecting areas can be more than 5 times, preferably between 20 and 40 times as large as the flat material thickness and/or between approximately ca. 3 and approximately 20 times, particularly between approximately 10 and approximately 15 times as large as the strip width. This makes it possible to obtain a good compromise between the padding material thickness co-determined by the free strip length and the damping or absorbing action. It must be borne in mind that experience has shown that the padding action decreases as the strip length increases.

Through the use, made possible by the invention, of substantially two-dimensional, inherently rigid flat or packaging material for the production of substantially three-dimensional, shock-absorbing padding material not only is the disposal problem solved with respect to the not further usable cardboard packaging or the like, but also inexpensively producible padding material is provided, which can optionally be used several times and if a further use is not necessary or desired, can be returned in environmentally friendly manner to the disposal cycles already established for packaging materials. It is obviously possible to use as the starting material flat material which has previously been used for another purpose.

An apparatus for the manufacture of padding material particularly suitable for performing the described method is based on the principle of the known document or data shredder. It has a cutting mechanism with two cooperating, oppositely drivable cutting rollers, whereof each has a plurality of cutting disks, which are axially bounded by cutting edges and between which there are axial gaps, in which in each case engage the cutting disks of the other cutting roller in an overlap area up to a maximum overlap depth for the purpose of producing a cutting engagement. In apparatuses according to the invention the cutting rollers are constructed in such a way that the cutting engagement between adjacent cutting disks is interrupted at least once during a revolution or cycle. Thus, during a normally preponderant part of the cycle a strip cut is produced in the manner of the known strip cutter-document shredder, but during the interruption of the cutting engagement a linking bridge remains between directly adjacent strips. The deformation of adjacent strip sections in opposite directions is achieved without further working steps in that the flat material strips are pressed by the cutting disks into the facing gaps or recesses of the in each case other cutting roller.

A further development is particularly advantageous in which the cutting disks preferably have circular circumferential surfaces, which are interrupted by at least one circumferential groove or marginal recess, the groove having a depth which is equal to or larger than the maximum overlap depth of cooperating cutting disks. Thus, outside the groove area in the vicinity of the cutting gap there is an overlap and therefore a separation of adjacent material areas, whereas in the overlap-free circumferential portion in the vicinity of the groove no cutting engagement occurs and correspondingly a bridge connecting the strip sections in the transverse direction remains. Its longitudinal extension is essentially determined by the circumferential length of the groove area, which is the same or less than the overlap depth. This circumferential length can e.g. be between approximately 2 and approximately 5% of the cutting disk circumferential length. According to a preferred further development the cutting disks have in each case two diametrically facing grooves and it is generally preferable if a cutting disk has a preferably even number of grooves regularly distributed about the cutting disk circumference, e.g. two, four, six or eight such grooves.

According to a further development, the cutting rollers are so mutually positioned that in an overlap area of cutting disks, at least for certain disks, alongside a groove of one cutting disk of one cutting roller is positioned a groove of a cutting disk of the other cutting roller. As a consequence thereof on rotating the cutting rollers on some axial cuts thereof the grooves of displaced facing cutting rollers meet. This makes it possible to attain for a uniform padding behaviour of the padding material a particularly preferred deformation substantially symmetrically to the starting material face. In the case of meeting grooves a cutting engagement is also avoided if each groove is flatter than the maximum overlap depth, provided that the sum of the groove depths exceeds the maximum overlap depth, so that in the cutting gap there is an internal spacing between the groove bases or bottoms.

It is particularly advantageous if grooves of adjacent cutting disks of a cutting roller are circumferentially displaced by an even-numbered fraction of 180° with respect to one another, e.g. by 45, 60 or 90°. As a result of this displacement of the grooves, it is possible to ensure that the connecting areas of individual strips or strip groups, considered longitudinally, are alternately transversely, mutually displaced. As a result the cut padding material is readily flexible in the longitudinal and transverse directions and is reversibly extensible in the transverse direction.

To avoid an undesired crosscutting or tearing at the strip sections in the vicinity of the groove edges, according to a further development in the transition area between a groove and the circumferential surface of the cutting disk a chamfer and/or curvature is provided.

For ease of operation during material supply and padding material removal according to a preferred embodiment the cutting disks are superimposed, so that a supply of the generally planar flat material and a removal of the padding material produced can take place horizontally. In the case of a horizontal material throughput, it is e.g. particularly simple to have a suitable collecting and/or conveying mechanism or the like following the material outlet.

A method particularly useful for operating the driving electric motor of the cutting mechanism of the cutting mechanism of the described apparatus is characterized in that an at least single phase alternating current is generated from a direct current, particularly of arbitrary origin by conversion and is used to supply the electric motor.

Devices for constructively similar document shredders frequently have so-called universal motors, whose special construction also permits operation with a.c. voltage. For applications such as in the office sector, they are normally operated with the standard a.c. voltage of the building (230 volt, single phase). Disadvantages of universal motors caused by their construction such as wear and radio-interference problems are partly avoided through the use of three-phase asynchronous motors, e.g. squirrel cage motors. However, it is necessary to install for these separate three-phase current connections or terminals, which often involves high costs, more particularly in the office sector.

In other solutions the rotary field is generated by means of a phase-displaced magnetic field. The necessary phase displacement is brought about by the series connection of a capacitor, so as to operate therewith a single-phase motor. However, due to the high ohmic losses in the rotor and the high no-load current, the power characteristics of such drives are not particularly good. The power roughly corresponds to 65% of that of a comparable three-phase motor.

By the invention of the method for the driving electric motor with the features of claim 16 a method can be provided with which the drawbacks of the prior art can be avoided enabling a document shredder electric motor to be operated at a higher power level, so as in particular to permit connection to numerous supply terminals.

On the basis of the direct current a considerable design scope is obtained for the generation of the at least single-phase alternating current. Preferably three-phase alternating current, i.e. three-phase current is generated. The direct current can be converted into a variable frequency alternating current permitting an adaptation to the in each case required operating state of the electric motor. Preferably in the case of a Limited electric motor loading in operation a high frequency is set, so that particularly when using squirrel cage motors there is a higher speed and consequently a faster document shredding. It is possible to provide several fixed speeds with which it is possible to set different speeds (slow, medium, fast) for different operating modes. Further advantages, particularly on starting the electric motor, can be obtained through a continuous changing of the frequency and therefore the speed. Wear to the complete apparatus can be reduced by the avoidance of suddenly occurring peak loads or jerky speed changes. In addition, operating comfort is increased.

Special advantages of this method for devices for manufacturing padding material can be seen, amongst others, in that professional, efficient and robust rotary current motors become available for office uses without rotary current terminals. Advantages of rotary current motors also can be seen in low noise generation, which in turn is advantageous in office uses.

In particular a very good controllability of the rotary current machine is achieved by changing the frequency of the output rotary current at the inverter. Therewith thin card material can be worked very fast and thick or even very thick material can be worked with lower speed and very high torque. This allows to generate the respectively needed padding material from starting materials with various thicknesses according to individual needs, so that a storage of ready padding material becomes obsolete.

The starting material, in turn, is much more space saving than the padding material. Thanks to the invention it is possible, for the first time, to obtain these advantages using a device suitable for office use.

In addition, the amplitude of the a.c. voltage can be variable for adapting to the electric motor operating behaviour required by any particular user. Preferably the alternating current generated is sinusoidal and as a result of the power electronics of the converter it is also possible to produce other and in particular random shapes or wave shapes.

It is possible to obtain the direct current from a fixed installed direct current network and optionally from an emergency power supply. The direct current is preferably produced from a random alternating current supply, particularly a single-phase alternating current supply. Thus, a desired, e.g. three-phase alternating current can be generated by means of the direct current intermediate circuit from a normal 230 volt connection. With such a procedure a document shredder with a three-phase motor can be operated on a normal socket. Further advantages arising on converting an alternating current by means of a direct current intermediate circuit into an alternating current supply for the electric motor are the extensive, random adjustability of the frequency, amplitude and shape of the alternating current produced. Detailed explanations are given hereinafter in connection with the description relative to the drawings.

According to a possible method of the invention, the alternating current for the electric motor can be generated from the direct current by an inverter as the first converter, in which the inverter is preferably connected by means of an intermediate circuit to a rectifier as the second converter for generating the direct current from the mains voltage. The converters are preferably power electronics assemblies, e.g. equipped with triacs, power transistors or thyristors as valves. On the one hand the converters can be interconnected by means of a type of buffer and on the other it is possible to directly interconnect them, optionally via a direct current intermediate circuit. The inverter is constructed as a function of the alternating current to be generated and generally with six valves for generating the three-phase current.

An apparatus according to the invention for the operation of an electric motor of a document shredder for shredding flat material, which is advantageously suitable for the performance of the above-described method, has at least one converter, which generates an alternating current with at least one phase for the electric motor from a direct current. The converter operates as an inverter and preferably generates three-phase current. Advantageously a three-phase motor or asynchronous motor is used. An asynchronous motor with a squirrel-cage rotor is particularly advantageous for operation on a three-phase alternating current. By means of a converter with power electronics it is possible to generate an alternating current with a substantially random shape. Apart from the aforementioned inverter as the first converter it is possible to provide a rectifier as the second converter and this makes it possible to generate the direct current from an alternating current supply. This can e.g. be single-phase, e.g. in the form of a standard socket installed in a home or office. The second converter can be connected by means of a variably constructed intermediate circuit to the first converter. An adjustment of the frequency of the first investor for changing the votation speed of the motor an be manually operable, for instance for an increase of the frequency by a factor of at least three up to ten maximum.

It is also possible to provide on the electric motor a tachometer, particularly on one of its shaft ends for regulating at least one of the converters as a function of the load situation and/or the position of the motor shaft. Load sensing can take place by means of a tachometer, a current detection or any suitable sensor means. This is advantageously used for controlling the first converter. These and further features can be gathered from the claims, description and drawings and the individual features, both singly or in the form of sub-combinations, can be implemented in an embodiment of the invention and in other fields and can represent advantageous constructions for which protection is hereby claimed.

BRIEF DESCRIPTION OF THE DRAWINGS

An embodiment of the invention is described hereinafter relative to the attached drawings, wherein show.

DETAILED DESCRIPTION OF THE PREFERRED EMBODIMENTS

Figure 1:
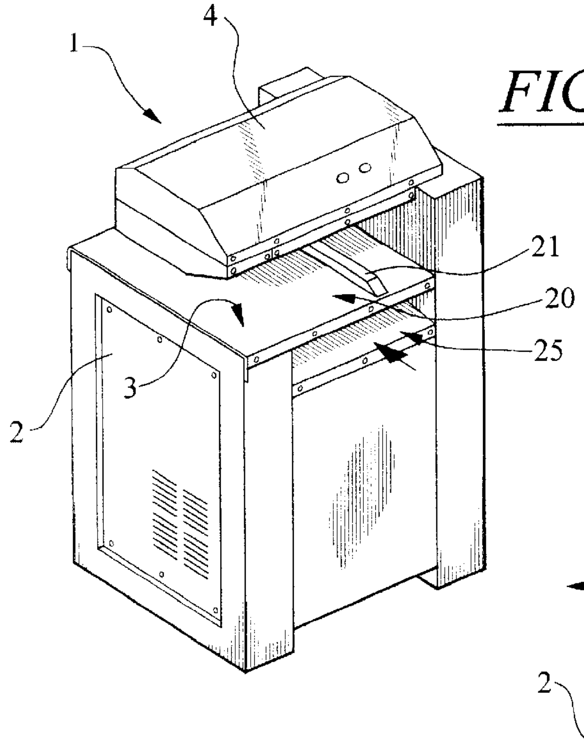
FIG. 1 A sloping perspective overall view of an embodiment of an inventive apparatus for the manufacture of padding material.
Figure 2:
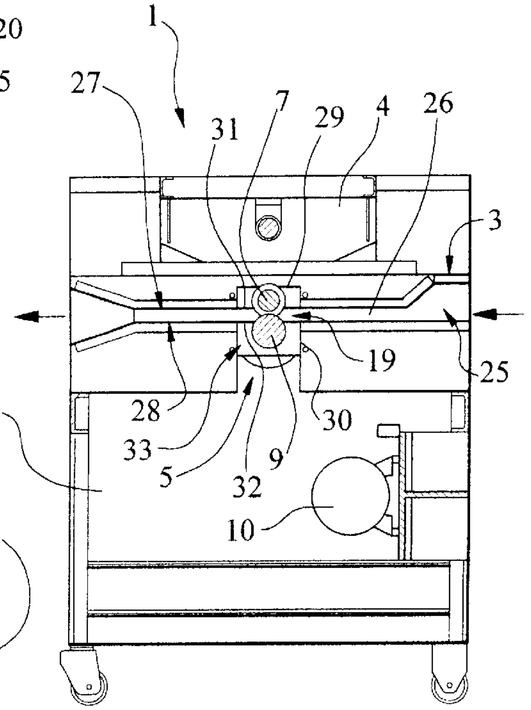
FIG. 2 A vertical longitudinal section through the apparatus according to FIG. 1.
Figure 3:
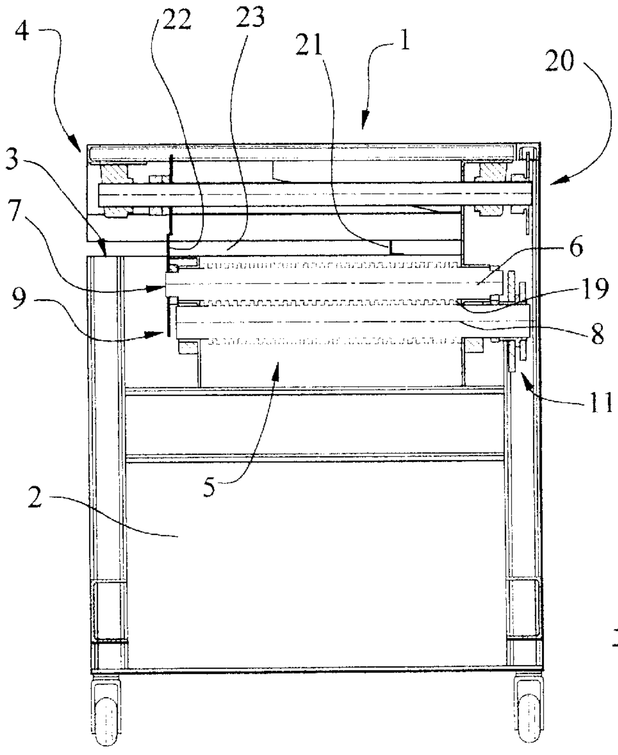
FIG. 3 A vertical cross-section through the apparatus of FIG. 1 in the vicinity of its cutting mechanism.

FIGS. 1 to 3 show an apparatus 1 for the manufacture of shock absorbing padding material from cardboard packaging or other suitable, inherently rigid flat material. The apparatus has a casing with a box-like base 2 set up on securable, guidable rolls and having a substantially planar upper surface 3 and a horizontally positioned, flat casing top A positioned at a distance of a few centimetres above the casing base and on whose front side are located machine controls.

An integrated cutting device 20 for the flat material comprises a longitudinally moving stop ledge 21 fitted to the top 3 and a vertical cutting blade 22 arranged with a transverse spacing of approximately 40 cm with respect to said stop ledge in such a way that a horizontal gap 23 open on the blade side is bridged between the base upper surface 3 and top 4 and also serves as a support for the latter. The cutting device 20 makes it possible to cut to size or length from possibly large flat material portions strips with a width corresponding to the working width of the cutting mechanism.

Directly below its upper surface 3 and roughly centrally between the front and rear walls a cutting mechanism 5 is located in the casing base and has an upper cutting roller 7 rotatably mounted about a horizontal axis 6 and a lower cutting roller 9 rotatable about an axis 8 parallel to the axis 6 and located vertically below the roller 7. The superimposed cutting rollers are rotated in opposition by an electric motor 10 fixed below the cutting mechanism to the casing front wall by means of a synchromesh gear 11.

Each of the cutting rollers (FIG. 6) manufactured from solid metallic material by turning (recessing) has a through cutting shaft 12 and cutting disk 13, projecting in regularly spaced manner therefrom and between which are formed circular groove-like gaps 14. For each cutting roller there are approximately 50 cutting disks with an approximate diameter of 78 mm and an approximate width of 4 mm. which gives a total working width of the cutting mechanism of approximately 43 cm. Each of the cutting disks has a substantially cylindrical, radial circumferential surface 15 interrupted in the vicinity of subsequently described grooves and is axially bounded by gap-bounding cutting edges 16, which are substantially planar and perpendicular to the shaft axes.

Figure 5:
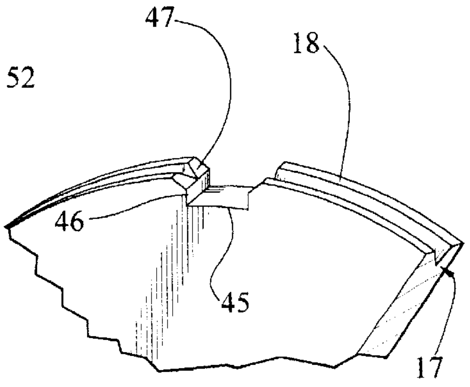
FIG. 5 A detail of a cutting disk of another embodiment in the vicinity of a circumferential groove.

In the embodiment of a cutting roller shown in FIG. 5 the circumferential surface is subdivided by a central, circumferentially directed V-groove 17 and the circumferential surface strips adjacent to the lateral flanks are roughened by an axial knurling 18. The surface roughening, which can also be brought about by shot or sand blasting, serves to improve the draw-in or feed behaviour of the cutting mechanism. The cutting disks can also be manufactured from individual ring disks which, accompanied by the interposing of spacing disks or the like, are lined up in non-rotary manner on a shaft. The vertical spacing of the cutting roller axes 6, 8 is so dimensioned that the cutting disks remain in engagement with one another up to a maximum engagement depth or overlap 49 and in each case alternately one cutting disk of one cutting roller engages in the gap or space between two cutting disks of the opposite roller. Between the cutting disk circumferential surface and the bottom of a gap formed by the cutting shaft of the opposite cutting roller there is an internal spacing roughly corresponding to the engagement depth 44 and/or can be between approximately 5 and 20% of the cutting disk diameter. In order to be able to produce a cutting engagement between the cutting disks, the gaps 14 are only wider by tenths of a millimeter than the cutting disks engaging therein. The engagement or overlap area 19 of the cutting disks is also referred to as the cutting gap of the cutting mechanism.

In the represented embodiment the flat material to be cut and shaped into padding material is horizontally guided to the cutting mechanism by means of a material feed 25 and is horizontally removed after separation. For this purpose, roughly level with the cutting gap, in the casing base 4 is provided a material guide channel 26 which is a few centimetres higher and approximately 40 cm wider and which is bounded in front of and behind the cutting mechanism by parallel, planar, horizontal bounding surfaces 27, 28 and widened both on the inlet and outlet sides in the vicinity of inclined faces in order to facilitate material introduction and/or removal.

On either side of the material guide channel the cutting rollers are located in downwardly or upwardly opened rectangular recesses 29, 30, which are bridged level with the bounding surfaces 27, 28 by inserted deflectors 31, 32 of a stripper 33. The rectangular, U-shaped deflectors are inserted between the two cutting rollers and pass between the edges of the recesses 29, 30 in a horizontal direction in the extension of the bounding surfaces 27, 28 and tangentially to the cutting shafts close to the shaft-near bottoms of the gaps 14. In the vicinity of the cutting disks they have rectangular slots through which the cutting disks project with a limited lateral spacing, but without edge contact into the area of the material guide channel 26. The deflectors are used for stripping the padding material produced from the cutting rollers and prevent an entrainment of cut material by the rollers in the area of the recesses. Compared with conventional, individually engaged, single strippers they can be manufactured much less expensively for a comparable stripping action, because they can e.g. be punched in one piece from a sheet metal part and bent for forming the rectangular shape.

The cutting mechanism 5 has a similar construction to that of known strip cutting document shredders, but as a result of a special geometry of the cutting rollers in the vicinity of the cutting disks in place of through cuts, longitudinally, zonally interrupted cuts are produced. As a result the treated flat material is subdivided into interconnected strip sections and for obtaining an adequate padding effect the strip sections are in each case alternately deformed or deflected in opposite directions. This can e.g. be achieved by the geometry of the cutting disks shown in FIG. 4. The cutting disks of the cutting roller 40 are in each case identically shaped, but axially adjacent cutting disks are in each case mutually rotationally displaced by 90°. On its circumference the front cutting disk 41 has two grooves 43, 44 arranged diametrically to the cutting shaft axis 42 and circumferentially interrupt the outer circumferential surface, which for simplification reasons is shown in circular cylindrical form, but which is normally structured by a knurling or some other roughening.

The grooves have in each case a substantially planar base or bottom 45 oriented perpendicular to the shaft radius and which extends over a circumferential angle of e.g. approximately 10 to 15° and which is bounded by parallel marginal sections 46 running perpendicular to the groove base in the circumferential direction. At approximately half the height they pass into inclined faces 47 sloping approximately 450 to the radial. This inclined flattening, which can be replaced by a transition radius, breaks the groove edges and prevents an undesired transverse cutting in the case of an overlap of adjacent cutting disks in the groove area.

The groove depth 48, which corresponds to the radial spacing between the groove base 45 and the imaginary arcuate extension of the radial circumferential surface in the central area of the groove, is so adapted in the embodiment shown to the center distance of the cutting shafts and the diameter of the cutting disks that it is larger than the maximum overlap 48 of the adjacent cutting disks which are in cutting engagement. This overlap 49 (FIG. 6) is calculated as the difference between the sum of the maximum cutting disk radii of cooperating cutting rollers and the center distance of the cutting rollers. The cutting disk 50 adjacent to the cutting disk 41 is turned about the axis 42 by 90° with respect thereto, whilst the following cutting disk 51 is again aligned with the front cutting disk 41 and the rear cutting disk 52 with the second cutting disk 50, etc.

Figure 6:
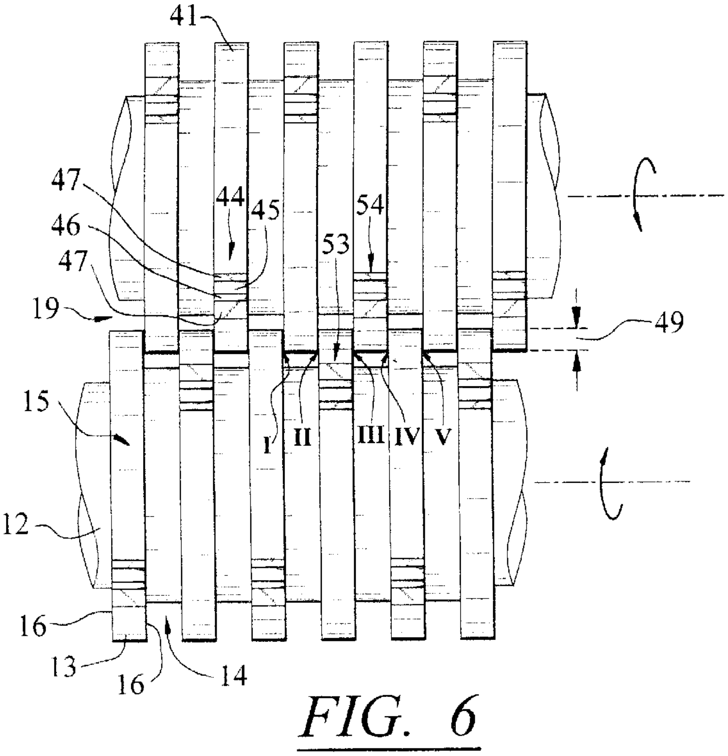
FIG. 6 A horizontal plan view of an axial section of an embodiment of a cutting mechanism.

The axial sequence of oppositely displaced cutting disks can be readily gathered from FIG. 6. The latter shows an axial detail of the cutting mechanism considered in the material feed direction, the cutting rollers being turned by e.g. approximately 30° compared with FIG. 4, so that the grooves can be seen in oblique viewing. For a groove 44 of disk 41 just about to enter the overlap area for illustration purposes the groove-bounding faces carry the reference numerals of FIG. 4. It is clear that on further opposing rotation of the cutting rollers the grooves of displaced facing cutting disks in each case enter or meet simultaneously in the cutting gap 19 (cf. FIG. 7). Thus, in the axial direction there is a repeating sequence of different engagement conditions between in each case cooperating cutting disks. In the overlap area I groove-free circumferential sections of the cooperating cutting disks meet, whereas in the overlap area II a groove-free section of the upper cutting disk meets a groove 53 of the lower cutting disk. In area III groove 53 meets a groove 54 of an upper cutting disk, said groove in area IV meeting a groove-free section of a lower cutting disk. Finally, in area V, once again two groove-free circumferential sections of cutting disks meet. Following further rotation of the cutting rollers by 90° said engagement series sequence is displaced by two cutting disk widths in the axial direction of the cutting rollers, so that then e.g. in area III there is a through cut. This periodicity with a length of four cutting disk widths is apparent in the construction of the padding material shown in FIG. 8.

Figure 7:
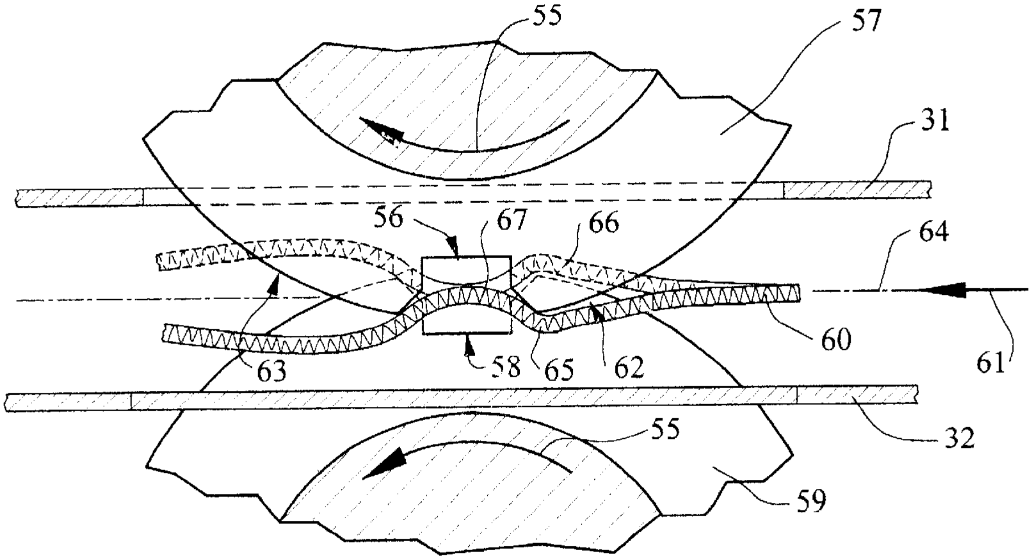
FIG. 7 A detail section through the cutting mechanism of FIG. 6 on separating or cutting through flat material.

With the aid of FIG. 7 will now be given an explanation of a method for the manufacture of the padding material using said apparatus and in exemplified manner is shown the case where with opposing rotation of the cutting rollers in the directions indicated by the arrows 55 a circumferential groove 56 of the upper cutting disk 57 facing the viewer meets in the cutting gap a groove 58 of a rearwardly positioned, lower cutting disk 59.

The flat material 60, e.g. a single-layer corrugated board, enters the overlap area of the cutting disks in the horizontal feed direction 61 and is separated by shearing wherever the cutting flanks of cooperating cutting disks overlap in optionally rubbing or abrading manner and the width of the resulting strip section substantially corresponds to the width of the cutting disks. The cutting separation of the material commences when the material enters the generally lenticular overlap area (between points 62 and 63 in FIG. 7) and continues with progressive rotation of the cutting rollers accompanied by the drawing of material into the cutting gap for as long as cutting flanks axially face one another. On either side of the cut, the material is pressed by the in each case adjacent cutting disks into the facing gap associated with the cutting disk, which leads to a deformation of adjacent strip sections in opposite directions relative to the normally planar neutral face 64 of the flat material. In the present example the strip section 65 facing the viewer is pressed downwards by the upper cutting disk 57 or its cylindrical circumference, whereas the rear strip section 66 is pressed upwards by the lower cutting disk 59. The longitudinally progressing strip cutting is interrupted as soon as the cutting engagement between cooperating cutting disks is discontinued. In the embodiment shown this occurs where the grooves 56, 58 meet. The flat material in this area remains largely intact and uncut and forms a connecting area 67, which links and holds together transversely adjacent strip sections. It is clear that the length of the interruption of the longitudinal cut is dependent on the circumferential extension of the groove portion which is deeper than the maximum overlap depth. The stiffness of the resulting padding material in the longitudinal direction is co-determined by the length of the connecting sections. It is also clear that the length of the strip sections separate from one another between the connecting areas is dependent on the circumferential spacing of successive grooves. These dimensions can be varied widely in accordance with the flat material used and the desired padding effect through a corresponding design of the shaft diameter, cutting disk width and groove number.

Figure 8:
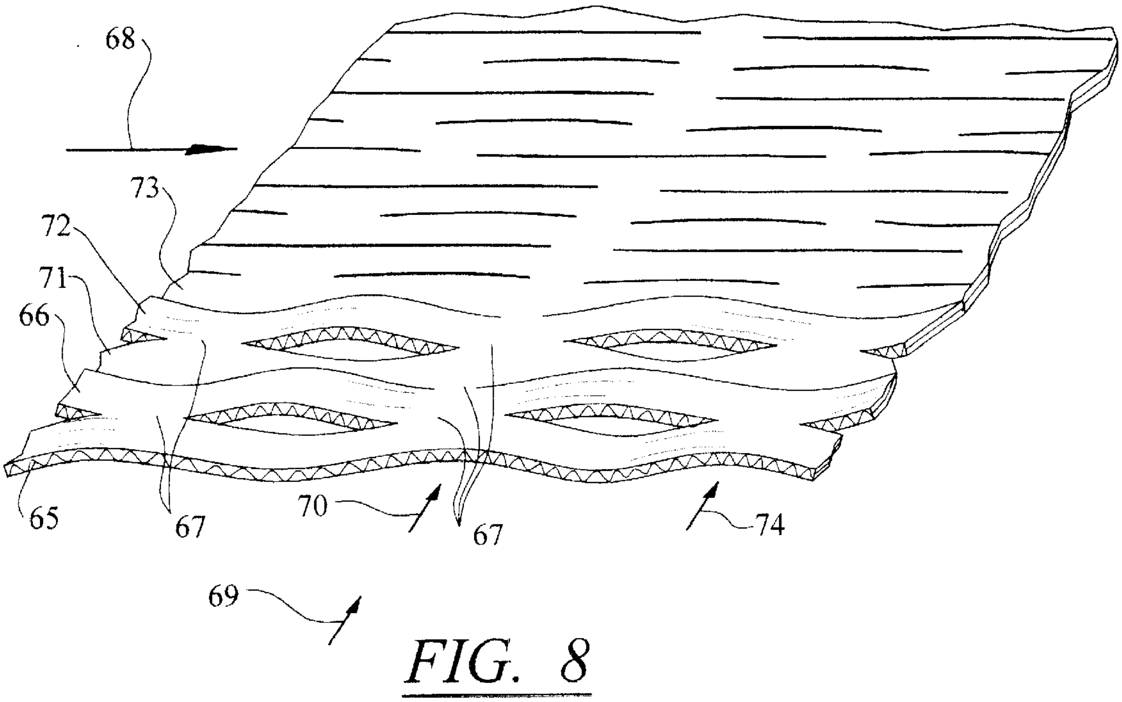
FIG. 8 A sloping perspective view of a detail of padding material manufacturable with an apparatus according to FIGS. 1 to 7.

The padding material manufactured by the described apparatus from single-layer corrugated board 60 shown in FIG. 8 comprises strip sections 65, 66 parallel to one another in the longitudinal direction 68 and whose width in the transverse direction 69 is determined by the width of the cutting disks and in the present example is approximately 4 mm. Adjacent strip sections in the transverse direction 69 are interconnected in the vicinity of the longitudinally spaced connecting areas 67, the length of the connecting areas being substantially determined by the groove widths of the cutting disks and can e.g. be approximately 6 to 8 mm. As a result of the opposing twisting or deformation of adjacent strip sections in opposite directions described in conjunction with FIG. 7, considered in the transverse direction, the strips are alternately bent in opposite directions, the bending effect being partly maintained by frictional holding together of the bent strip sections close to the connecting areas. To facilitate viewing only the four strips facing the view are shown in their deformation state.

Figure 4:
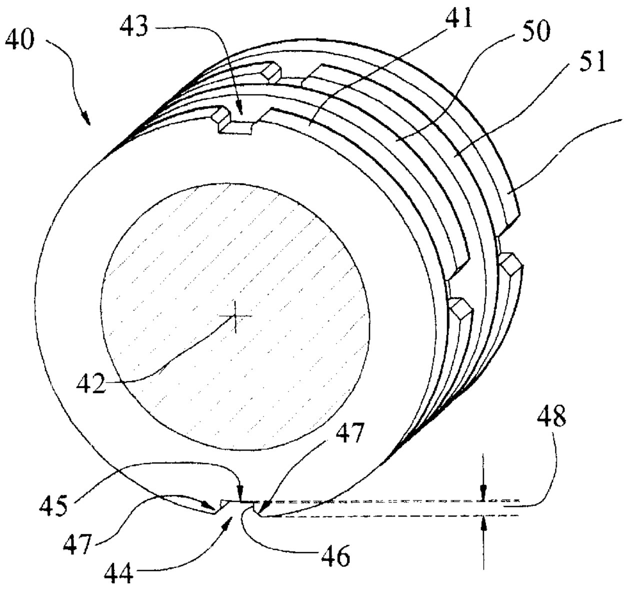
FIG. 4 A perspective view of an axial detail of a cutting roller of the cutting mechanism.

As a result of the displacement of the circumferential grooves explained relative to FIGS. 4 and 6, the connecting areas or cut interruptions are alternately mutually displaced between individual strips. With the connecting zone 70 running approximately centrally and transversely over the shown area, the front strip section 65 is connected to the next strip section 66. There is also a connecting zone of roughly identical width with respect to the following strip section 71 and the juxtaposed strip 72. Between strip 72 and the neighbouring strip 73 there is instead a longitudinally directed cut at right angles to the connecting zone 70 through which the connected group of four adjacent strips 65, 66, 71, 72 in this area is separated from the neighbouring group of four of identically interconnected strips. As a result of this separation the strip groups can, if necessary, be bent in opposite directions relative to the flat material face. This periodicity comprising four strips is brought about by the sequence of cutting engagements I, II, III, IV and V explained relative to FIG. 6, the longitudinal cuts passing through the connecting zone 70 being produced in each case in the vicinity of the cutting engagements I and V.

In the case of the following connecting zone 74 in the longitudinal direction, the longitudinal cuts dividing the connecting zone longitudinally are transversely displaced by two strip widths, so that there is e.g. a through cut between strips 66 and 71. This alternately displaced connection or separation of adjacent strips brought about by the displacement of the grooves means that the cut padding material is very flexible both longitudinally and transversely, the flexibility being greater about the longitudinal axis. In the transverse direction there is an elastic extensibility, so that the material can be spread out e.g. to twice its width without tearing. An expanded metal-like structure of the spread out padding material is obtained, the connecting areas being inclined to the extension direction.

Figure 9:
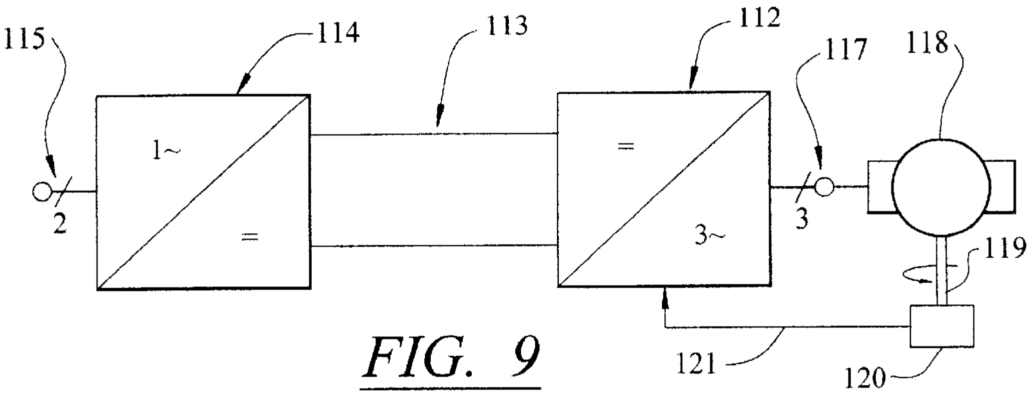
FIG. 9 A diagrammatic representation of a rectifier and an inverter supplying an electric motor.

FIG. 9 shows a possible arrangement with an inverter 112 as the first converter, which is supplied by a direct current and generates three-phase alternating current or three-phase current having a random frequency, shape and amplitude. By means of the direct current intermediate circuit 113 the inverter 112 is supplied by the rectifier 114, which generates a direct current from single-phase alternating current. For this purpose it is connected to an alternating current connection 115, e.g. to a mains socket.

The inverter 112 is connected by means of a three-phase connecting lead 117 to a three-phase motor 118. Particularly at a shaft end 119, the three-phase motor 118 has a tachometer 120, which detects the speed and/or position of the rotor of the motor 118. The data are returned to the inverter 112 by means of a feedback 121 and can be used for regulating the supply of the three-phase motor 118. The motor 118 e.g. drives a cutting mechanism of a document shredder, which preferably has interengaging cutting rollers driven by the motor by means of a transmission.

Optionally the direct current intermediate circuit 113 can contain a voltage raising device. This makes it possible to supply the inverter 112 with a voltage which, under certain circumstances, can be considerably higher than that at the inverter connection 115.

Figure 10:
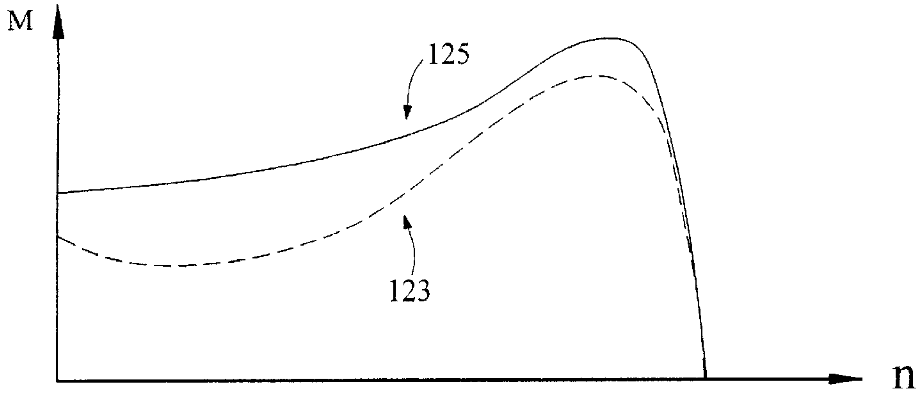
FIG. 10 A characteristic of a three-phase motor compared with that of a capacitor motor.

FIG. 10 shows in broken line form a characteristic's of a capacitor motor compared with a three-phase motor Characteristic 125. The torque M is plotted over the speed n, which is correlated with the working frequency. As can be seen, at the three-phase motor characteristic 125 the starting torque is higher than at the capacitor motor characteristic's, as is the breakdown torque, which is in the range of the maximum torque M. There is also no pronounced pull-up or saddle area of the characteristic 123, which in the low speed range follows the starting torque.

Figure 11:
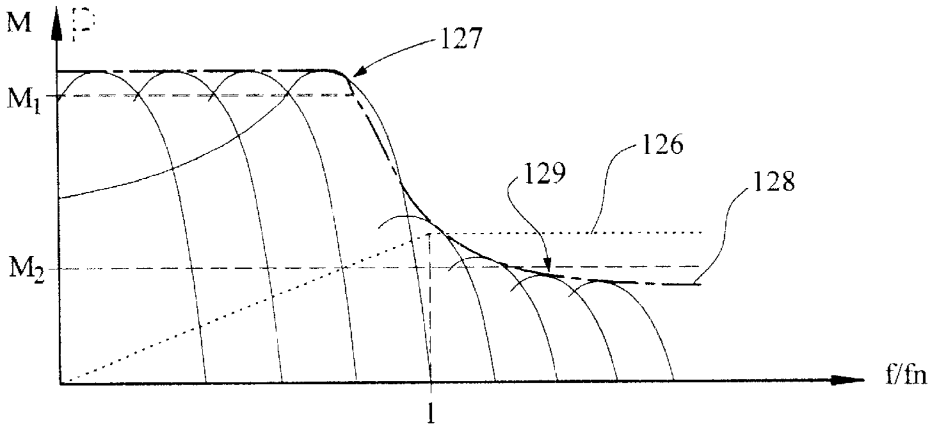
FIG. 11 A family of operating characteristics for a three-phase motor supplied according to the invention.

FIG. 11 is a graph showing a family of operating characteristics. For this purpose the torque M is plotted over the ratio of the working frequency f to the rated frequency $f_N$. There are laterally displaced characteristics, similar to the characteristic's in FIG. 2. Their maxima, i.e. the breakdown torques, form an envelope represented in dot-dash line form, which is initially horizontal and then falls away in a roughly parabolic manner.

The power P of the motor is plotted in dotted form over $f/f_N$. A point to be noted is that at $f/f_N$, is equal to 1. At a rated frequency $f_N$, of 50 Hz the edge frequency $f_{eck}$, is also 50 Hz, the mutual ratio of the two frequencies being 1. The power curve starts as an origin line at zero and as from $f/f_N$ equals 1 is in the form of a constant. This means that up to the edge frequency $f_{eck}$ at $f/f_N$ the motor power increases and remains roughly the same as from the edge frequency. In the case of the squirrel cage motor the voltage and output power are proportional to one another. In an implementation possibility of the present invention the rated frequency can be higher than 50 Hz, e.g. 120 Hz.

Two working points of the three-phase motor on different characteristics are plotted. The first working point 127 with M1 has almost its maximum torque at $f/f_N$ lower than 1. This first working point 127 is used in a document shredder for handling large paper quantities by setting the frequency f lower than $f_N$ by means of the inverter 112. Admittedly the cutting speed drops, but virtually the maximum torque is obtained. A torque increase is possible by a voltage rise under $f_N$.

The second working point 129 was chosen at a frequency well above $f_N$. The torque $M_2$ obtained is admittedly significantly lower than with the first working point 127, but the frequency f is roughly twice as high and consequently so is the cutting speed. This second working point-129 is preferably chosen for handling smaller quantities of paper to be cut. The dash-dotted line 128 is the curve on which all working points are positioned.

In the range up to f equals $f_N$, the motor is driven with a constant magnetic flux. The breakdown torque remains constant. When the voltage reaches its maximum value only the frequency is further increased. The magnetic flux and consequently the torque available decrease as a result of field weakening. In the case of a substantially constant power, the breakdown torque decreases quadratically. By a corresponding choice of the voltage control characteristic (edge frequency variation) the motor torque delivered can be increased and consequently the cutting capacity optimized.

If during initial operation in the field weakening range the motor records a low load or paper quantity, it continues to operate in this range and for this purpose a current monitoring is advantageous. However, if more paper is supplied the inverter 112 regulates the frequency back to the edge frequency. If even more paper is supplied, the inverter regulates the frequency and, if desired, the voltage back in order to control the maximum motor torque. If the frequency and/or voltage reaches a lower threshold or the motor current and upper threshold, the motor 118 is switched off.

An apparatus according to the invention can contain in a device for producing padding material the inverter 112 and rectifier 114, as well as a direct current intermediate circuit 113. This makes it possible to construct a compact and uncomplicated equipment for connection, which merely needs to be connected to a mains socket by plugging in.

What is claimed is:

1. A method of manufacturing padding material from inherently flat material, the method comprising the steps of:

partially separating the flat material into strip sections in such a way that transversely adjacent strip sections remain interconnected in the vicinity of longitudinally spaced connecting areas; and deforming strip sections between connecting areas in a direction substantially at right angles to the flat material in such a way that transversely adjacent strip sections are deflected in opposite directions to form said padding material.

2. Method according to claim 1, wherein the step of separating the flat material takes place by strip cutting of the flat material and wherein, for producing the connecting sections, the strip cutting is zonally interrupted.

3. Method according to claim 1, wherein the step of separating the flat material is performed in such a way that in each case a number of transversely adjacent connecting areas form a cohesive group of interconnected connecting areas and wherein the cohesive groups are transversely separated.

4. Method according to claim 3, wherein the number of transversely adjacent connecting areas forming a cohesive group is three.

* * * * *